(12) United States Patent
Alkadi et al.

(10) Patent No.: US 9,378,256 B2
(45) Date of Patent: Jun. 28, 2016

(54) INDUSTRIAL GEOSPATIAL ANALYSIS TOOL FOR ENERGY EVALUATION

(71) Applicant: UT-Battelle, LLC, Oak Ridge, TN (US)

(72) Inventors: Nasr E. Alkadi, Oak Ridge, TN (US); Michael R. Starke, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 329 days.

(21) Appl. No.: 14/081,802

(22) Filed: Nov. 15, 2013

(65) Prior Publication Data

US 2015/0142802 A1 May 21, 2015

(51) Int. Cl.
G06F 17/30 (2006.01)
G06Q 10/00 (2012.01)
G06Q 50/06 (2012.01)

(52) U.S. Cl.
CPC .......... *G06F 17/30563* (2013.01); *G06Q 10/00* (2013.01); *G06Q 50/06* (2013.01); *Y02B 60/188* (2013.01)

(58) Field of Classification Search
None
See application file for complete search history.

(56) References Cited

U.S. PATENT DOCUMENTS

| | | | | |
|---|---|---|---|---|
| 8,606,686 | B1* | 12/2013 | Ippolito | G06Q 40/04 705/37 |
| 2006/0238919 | A1* | 10/2006 | Bradley | G06F 17/30303 360/128 |
| 2011/0106289 | A1* | 5/2011 | Efendic | G05B 23/0221 700/110 |
| 2012/0102053 | A1* | 4/2012 | Barrett | G06F 17/30592 707/754 |
| 2012/0283988 | A1* | 11/2012 | Pandey | G06Q 30/06 702/179 |
| 2013/0015967 | A1* | 1/2013 | Nagathil | G05B 23/0272 340/506 |
| 2014/0052503 | A1* | 2/2014 | Zaloom | G06Q 10/06393 705/7.39 |

OTHER PUBLICATIONS

Wikipedia contributors. "Google Earth." Wikipedia, The Free Encyclopedia. Wikipedia, The Free Encyclopedia, Rev. Nov. 12, 2012, accessed Wed. Dec. 8, 2015.*
Gopalakrishnan B. et al., "Analysis of Energy Conservation Opportunities in Glass Manufacturing Facilities," Energy Engineering, vol. 98, No. 6, 2001, pp. 27-49.
Gopalakrishnan, B. et al., "Comparison of Glass-Manufacturing Facilities Based on Energy Consumption and Plant Characteristics," The Journal of Energy Consumption and Development, vol. 27, No. 1, 2001, 1 page.
Industrial Assessment Centers Database website, printed from the internet at <http://iac.rutgers.edu/database/>, on Jun. 9, 2015, 1 page.
Ma, Ookie et al., "Demand Response for Ancillary Services," IEEE Transactions on Smart Grid, vol. 4, No. 4, Dec. 2013, pp. 1988-1995.

(Continued)

Primary Examiner — Richard Bowen
(74) *Attorney, Agent, or Firm* — Brinks Gilson & Lione

(57) ABSTRACT

An industrial analytic system processes industrial data. A database engine provides access to a plurality of database management systems that serve energy consumption and product sales data. An input filter that selectively passes the filtered data streams that comprise energy sales data, location data, and a business classification code data in datasets by removing selected datasets that do not include energy information. A standard deviation filter removes datasets from the filtered data streams that fall outside of a predetermined variation from an average value. A computation module analyzes the correlation between electrical energy consumption within a standard industrial classification code represented in the datasets and a programmable criterion.

21 Claims, 16 Drawing Sheets
(8 of 16 Drawing Sheet(s) Filed in Color)

(56) References Cited

OTHER PUBLICATIONS

Morrow III, William R., et al., "Cross-Sector Impact Analysis of Industrial Process and Materials Improvements," ACEEE Summer Study on Energy Efficiency in Industry, 2013, 12 pages.

US Census Bureau, "Manufacturing: Industry Series: Detailed Statistics by Industry for the United States: 2007," 2007 Economic Census of the United States, 2014, pp. 1-383.

US Energy Information Administration website, 2012, printed from the internet at <http://www.eia.gov/consumption/manufacuring/>, on Jun. 9, 2015, 3 pages.

* cited by examiner

INDUSTRIAL GEOSPATIAL ANALYSIS TOOL FOR ENERGY EVALUATION

STATEMENT REGARDING FEDERALLY SPONSORED RESEARCH AND DEVELOPMENT

The invention was made with United States government support under Contract No. DE-AC05-00OR22725 awarded by the United States Department of Energy. The United States government has certain rights in the invention.

BACKGROUND

1. Technical Field

This disclosure relates to a decision support system that executes energy evaluations, statistically models energy usage, and identifies spatiotemporal patterns within standard industrial classifications or groupings that identify lines of business.

2. Related Art

Executing energy evaluations and modeling energy consumption is challenging. Evaluations and models are often based on limited and unverified information. In manufacturing the challenge is greater because industrial attributes are less uniform than residential and commercial attributes and industrial data is not readily available.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

An industrial analytic system provides multi-layer industrial energy information at the manufacturing plant level, industrial subsector level, zone level (e.g., zip code level), regional level (e.g., county level), authority level, state level, and national level. The system executes statistical analysis on uniform and disparate datasets accessed from local and remote databases to estimate and forecast manufacturing energy consumption across geographic areas (e.g., such as more than 300,000 manufacturers across the U.S.). The system provides geospatial interlinking to virtual globes and superimposes images and objects on satellite imagery, aerial photography, three dimensional geographic information system globes, and two dimensional maps. Some industrial analytic systems render energy consumption estimates and fuel stream estimates at a granular level. Some industrial analytic systems generate models that provide energy intensive processes per Standard Industrial Classification (SIC) codes, load curves per process step per SIC code, and load factor per type of manufacturing plant, for example. And, some industrial analytic systems include architectures that provide an optimized experience to a variety of mobile devices by rendering content to the form factor of the displays of the mobile devices.

The industrial analytic system includes a database engine that provides access to pluralities of database management systems (DBMS). The database engine pulls information and datasets that may be in a variety of formats from one or more databases, one or more Very Large Databases (VLDB), or data warehouses, some which may contain volumes of data in the hundreds of gigabytes or terabytes size. The database engine may operate across a variety of different local or remote platforms and operating systems and is configured to operate with many different data repository applications including information accessible through Internet Web portals. Some database engines may execute data fusion by mining and integrating raw data from a plurality of sources to produce a new raw data set, such as a fused data set that includes energy consumption and sales, location data, and associated business classification codes.

Figure 1:
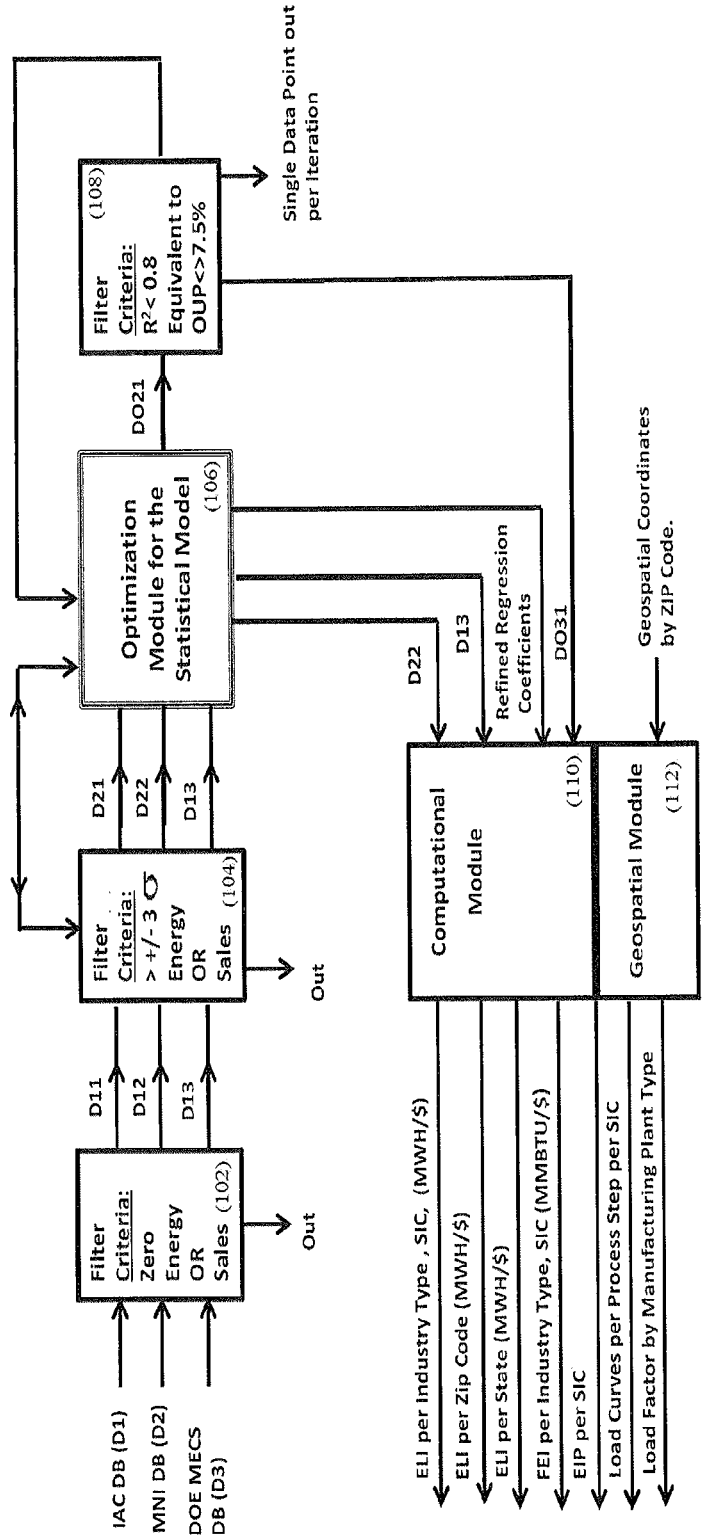
FIG. 1 is an industrial analytic system.

In FIG. 1, the database engine retrieves data from the Industrial Assessment Centers Database (IAC DB), the Manufacturer's News Database (MNI DB), and the U.S. Department of Energy's Manufacturing Consumption Survey Database (MECS DB). Access to these databases is transparent. Data mined from these remote external databases may be stored by the industrial analytic system's processing in relational databases, and/or document oriented (noSQL) databases or in a cloud. A cloud or cloud based computing may refer to a scalable platform that provides a combination of services including computing, durable storage of both structured and unstructured data, network connectivity and other services that may be accessible via the Internet. The metered services provided by a cloud or cloud based computing may be interacted with (provisioned, de-provisioned, or otherwise controlled) via one or more of the database engines or the input filter 102, the standard deviation filter 104, the optimization controller 106, the coefficient of determination filter 108, the computational module 110, the geospatial linking module 112, and/or the mobile computer server, for example.

In FIG. 1 an input filter 102 selectively passes the IAC, MNI, and MECS data streams that comprise energy and sales associated with a given industrial consumer and their respective SIC code(s). The input filter 102 removes datasets that contain unreported energy or sales information from the IAC, MNI, and MECS data streams. The data streams processed by a filter are appended with the filter's designation in FIG. 1. For example, data stream D13 indicates that the raw MECS data stream designated D3 was transformed by the input filter's hardware and input filter's software that comprises the input filter 102 into data stream D13 by eliminating or minimizing records that contain no energy and/or sales information. In other words, in those records where energy and sales are unreported, the records are eliminated or minimized from the data stream that is transmitted to standard deviation filter 104, the optimization controller shown as an optimization module 106, and the computational module 110.

The standard deviation filter 104 processes the filtered data streams by applying (+/−) n σ of sales and electrical energy consumption, where n σ comprises the number of standard deviations as expressed by equations 1-3.

$$\text{std\_lim} \geq (y(i) - \bar{y}) / \text{std}(y) \qquad \text{Equation (1)}$$

$$S(i) \geq 0 \qquad \text{Equation (2)}$$

$$E(i) \geq 0 \qquad \text{Equation (3)}$$

where, E represents energy in MWh, S comprises the sales in dollars, and y comprises the data value (either sales or energy). While alternative industrial analytic systems' standard deviation filters process data by filtering to other standard deviations functions, in the standard deviation filter 104 of FIG. 1, n=3 based on the empirical analysis shown in FIG. 2. When the revised data streams lie outside 3 σ, the data is replaced with the mean of the regional data set associated with that particular SIC code. So, for example, when the average sales for a data set lies outside of the 3 σ of that particular SIC sector, that data point within that data set is replaced with data representing the average sales in that particular SIC code sector.

In FIG. 1, the optimization controller shown as the optimization module 106 executes iterative computational algorithms that optimize the industrial analytic system's statistical model's accuracy. An exemplary optimization function may include comparing the actual aggregate industrial electrical energy consumption in a predetermined area such as within a fifty state geographic area, for example, with an aggregated modeled industrial energy consumption in the same geographic area or states using the datasets and information stored in the IAC DB and MNI DB to filter out data points that generate an error outside of a programmable threshold. Some industrial analytic systems use the published data from the Energy Information Administration (EIA) MECS DB (EIA Actual) as the actual aggregated industrial electrical energy consumption. The model error maybe minimized when n=3.

In FIG. 1 a coefficient of determination filter 108 removes the outlier data points from the IAC data stream. The coefficient of determination filter 108 iteratively performs a linear regression with a data point removed, and examines the impact on the $R^2$ value. The coefficient of determination filter 108 selects the highest resulting $R^2$ value. In some industrial analytic system analysis, an $R^2$ value limit of about 0.8 or higher was programmed as a reference threshold. A correlation between the $R^2$ values and the percentage of outlier data points (OUP) removed was then established. Using the optimization module 106, it was found that at about 7.2% OUP removal the model error is minimized.

Figure 2:
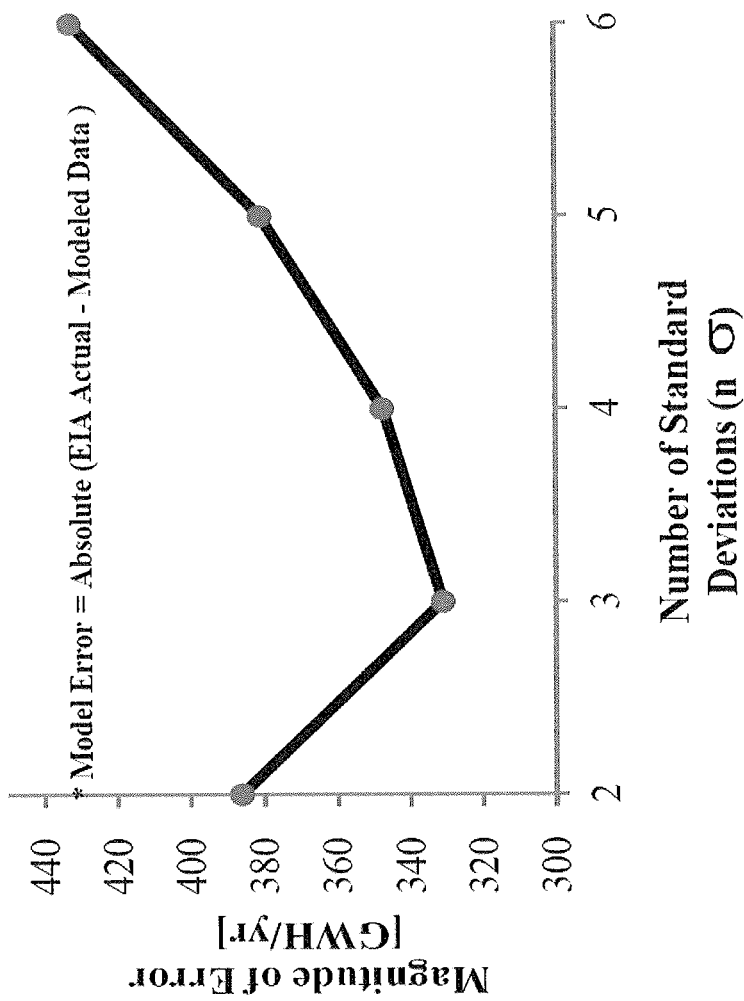
FIG. 2 is a graph of a model's error as a function of standard deviation from the sample mean.
Figure 3:
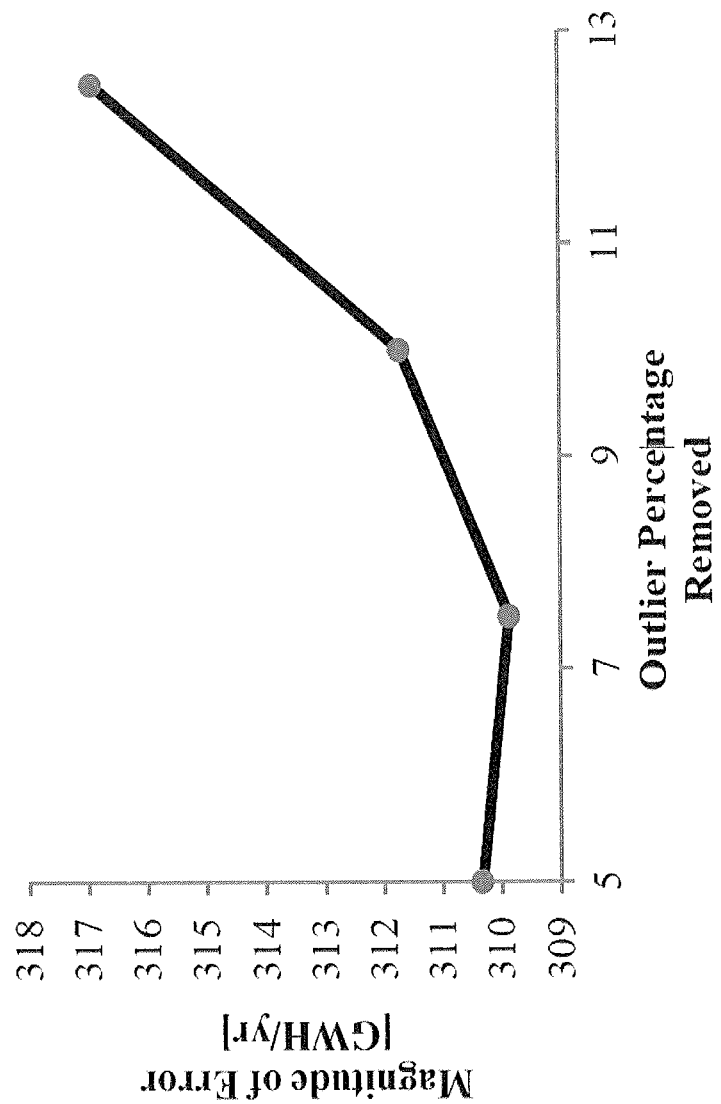
FIG. 3 is a graph of the model's error with the outliers removed.

It should be noted that some of the absolute magnitude of deviation in GWH/yr shown in FIGS. 2 and 3 may attributed to many factors including the number of represented industries in the source databases (e.g., EIA-MECS DB) as some industrial consumers or energy providers may not report or publish electrical energy consumption. And, the quality of regression analysis may be influenced by the size of the data points associated with some industrial sectors.

In some industrial analytic systems, a computation module 110 may execute linear regressions between sales and electrical energy consumption of different manufacturing industries, including industries represented by a 4-digit SIC code. The computational module 110 analyzed correlations between electrical energy consumption and square footage, number of employees per industrial consumer, number of operating hours, etc. The linear relationship may be expressed by equation 4.

$$y = \beta_0 + \beta_1 x + \epsilon \qquad \text{Equation (4)}$$

Where, $\beta_1$ represents the slope of the regression line (MWH/Sales), $\beta_0$ is the intercept and $\epsilon$ the error associated with the empirical observations. In many cases, the error between the data and linear relationship is minimized through the sum of the squared residuals or least squares. The regression coefficients may be solved using equations 5 and 6:

$$\beta_1 = (\Sigma xy - (\Sigma x E y / n1)) / (\Sigma x^2 - (\Sigma x)^2 / n1) \qquad \text{Equation (5)}$$

$$\beta_0 = (\Sigma y / n1 - \beta_1 \Sigma x / n1) \qquad \text{Equation (6)}$$

Where n1 represents number of data points. In some cases, outliers may cause the regression coefficients ($\beta_1$ and $\beta_0$) to have misleading values. The coefficient of determination $R^2$ provides a measure of how well future outcomes are likely to be predicted by the model. In the industrial analytic system, $R^2$ values may range between 0 and 1, where 1 indicates the highest prediction capability. The $R^2$ value may be expressed by equation 7.

$$R^2 = 1 - (\Sigma (y_i - f_i)^2) / (\Sigma (y_i - \bar{y})^2) \qquad \text{Equation (7)}$$

Where, $f_i$ represents the linear regression solution. The available information including sales and electrical energy consumption may be obtained mainly from the IAC DB. This information is applied to the linear regression equation to derive the coefficients of regressions as shown in equation 8.

$$E(SIC) = \beta S(SIC) + S_0(SIC) \qquad \text{Equation (8)}$$

where, E represents electrical energy of a given industry type in MWh, S represents product sales in a given industry type in dollars, and S0 represents a constant determined by the regression analysis. In some industrial analytic systems higher resulting values of β indicate industries where electricity is important in the manufacturing of a given industrial product.

Figure 4:
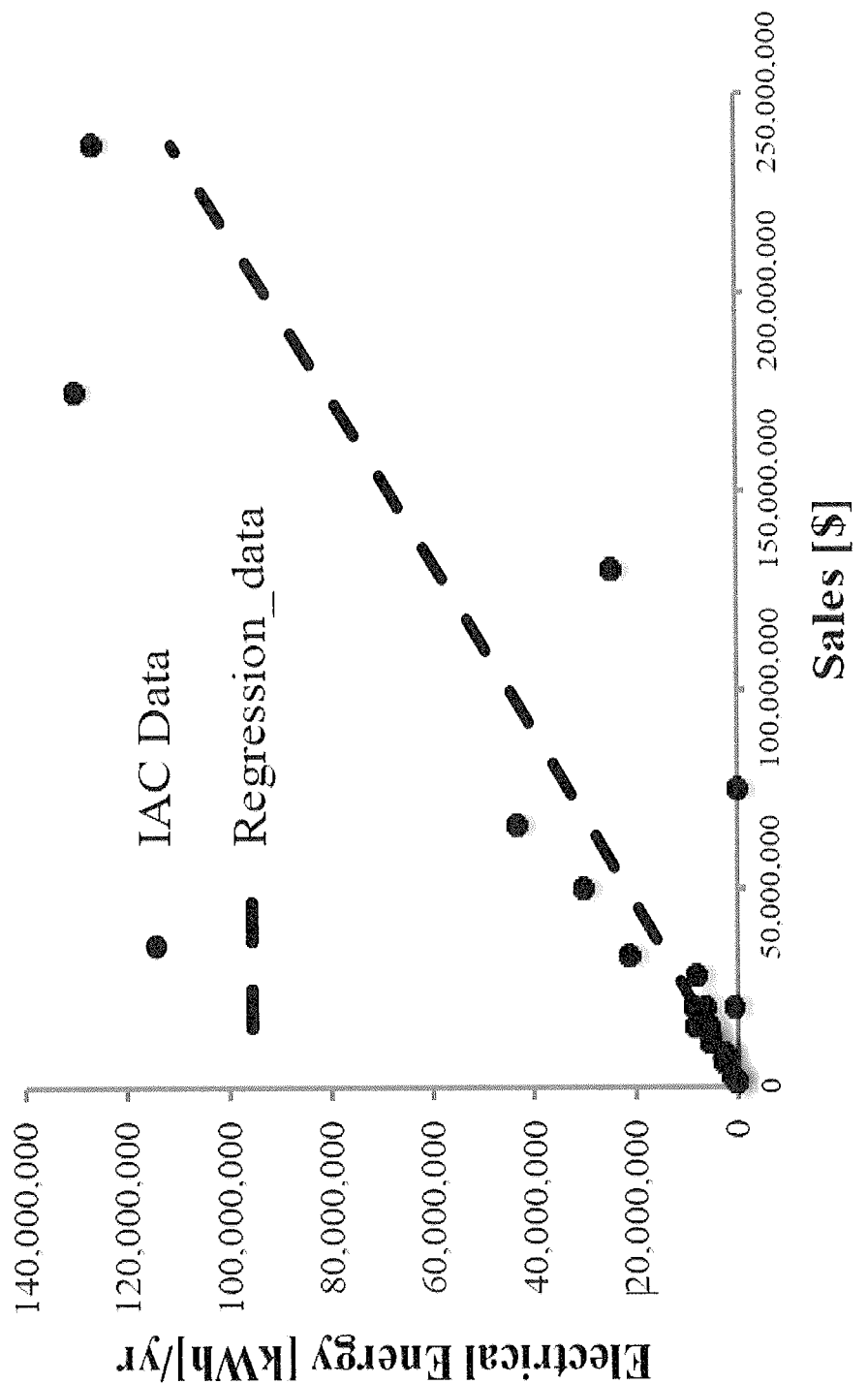
FIG. 4 is an exemplary regression analysis of a standard industrial classification.

An example of the linear regression performed for the glass industry (SIC 3211) is shown in FIG. 4. The derived coefficients of regression for each type of industry as represented by SIC code (accessed from IAC DB) were applied to the corresponding SIC code in the MNI database where the sales information of each manufacturing plant was processed to predict the plant level electrical energy consumption associated with the given SIC code across the U.S. industrial sector. An ELI metric comprises the electrical energy use in MWh per product sales in dollars or MWh/$ for short. Product sales represent the value added to a given entity, article, or substance by a manufacturing facility. The greater the value of the ELI the more important energy component such as electricity is to that industrial sector.

Figure 5:
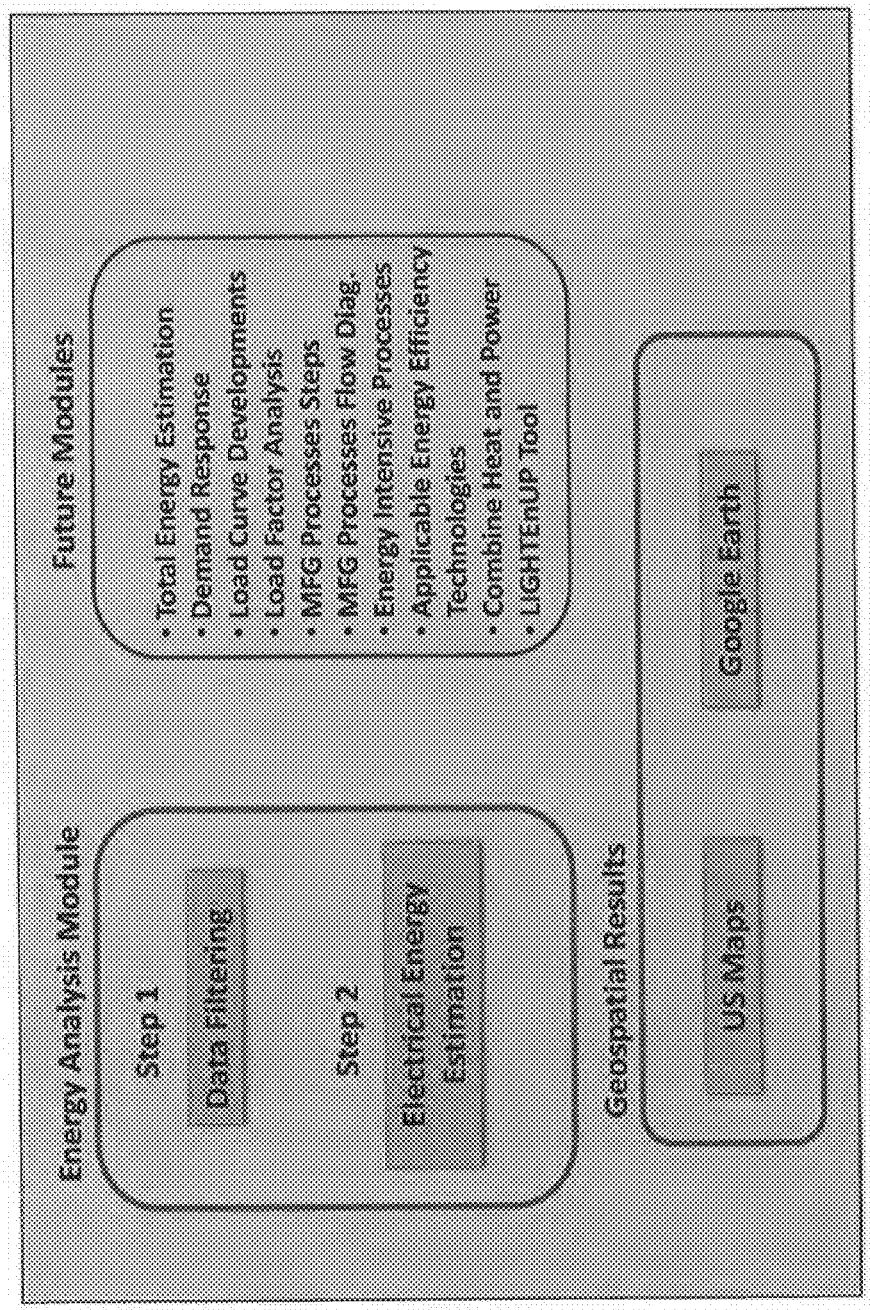
FIG. 5 is an exemplary graphical user interface.

A user may access some industrial analytic systems through icons, menus, and dialog boxes rendered by a layout or rendering engine (also referred to as a visualization engine) on a fixed local/remote or mobile screen. The user may select and activate these options through a relative or absolute pointing device, voice commands, gesture controls, and/or eye tracking technology. In FIG. 5, a Graphical User Interface (GUI) includes software routines that receives and translates user's actions; and executes applications that call routines with specific parameters. For example, a user may call an electrical energy analysis module and/or geospatial linking module 112. The Geospatial button enables the user to geospatially plot individual industries across a geographic area such as the U.S. at a granular level such as at a manufacturing plant level, zip code level, county level, regional level, state level, and/or national level. Some industrial analytic systems predict electrical energy consumption at these granularities.

Figure 6:
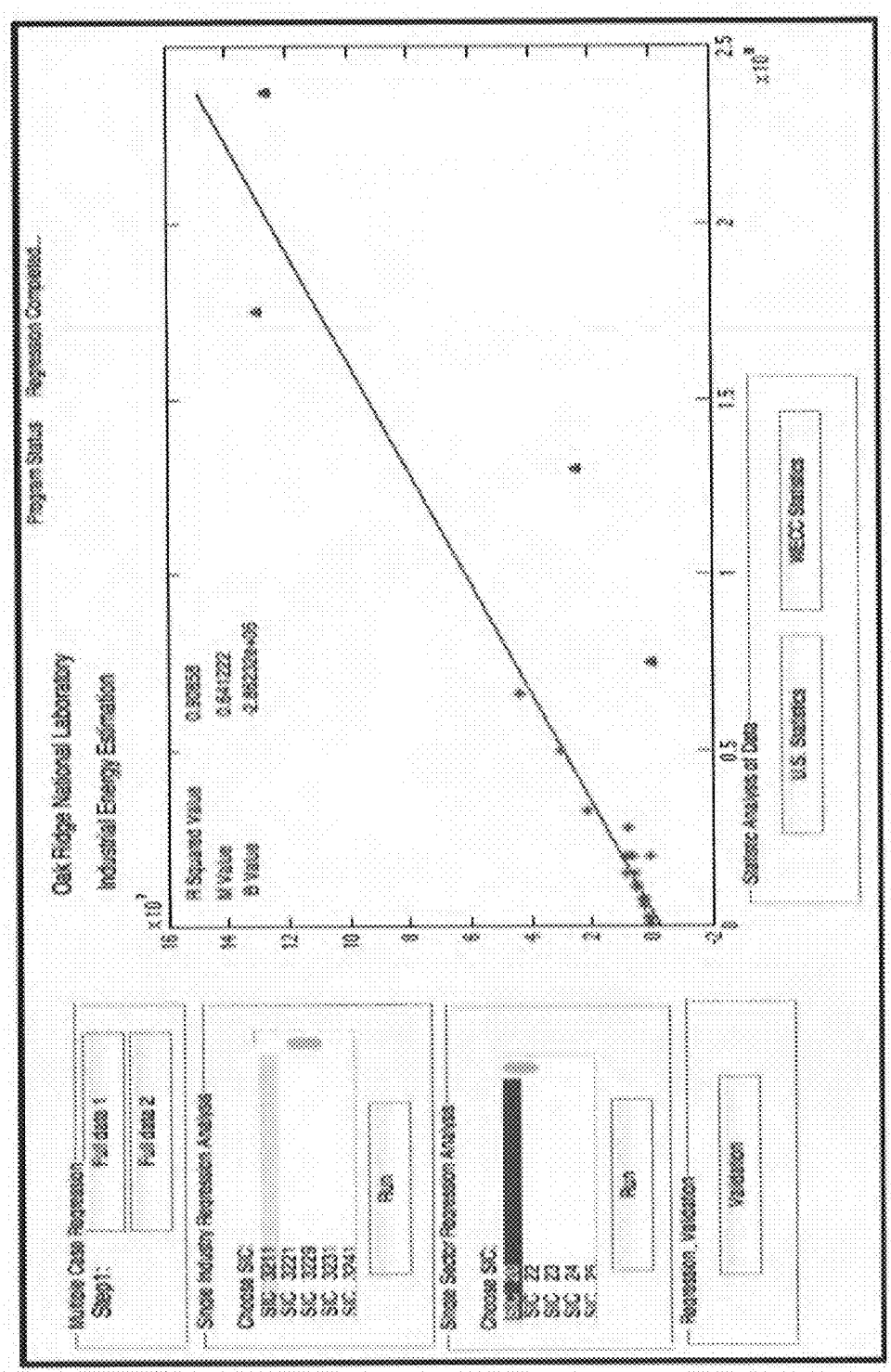
FIG. 6 is an exemplary regression engine interface and visualization engine interface.

The regression engine interface is shown in FIG. 6. The green stars represent actual data points of data stream D1 (IAC datasets), blue triangles represent the outliers, and the line represents the regression model for this data set. As shown, industries at both 2-digit SIC code and 4-digit SIC code are selectable for regression analysis. The graphic elements labeled "validation" on the GUI provides comparison against the statistics of industrial electricity consumption provided by the EIA-MECS DB. Selecting the graphic element 'U.S. Statistics' on the GUI executes further analysis of the information from across the U.S. including industry count by state and estimated electrical energy consumption by sector for each state.

Figure 7:
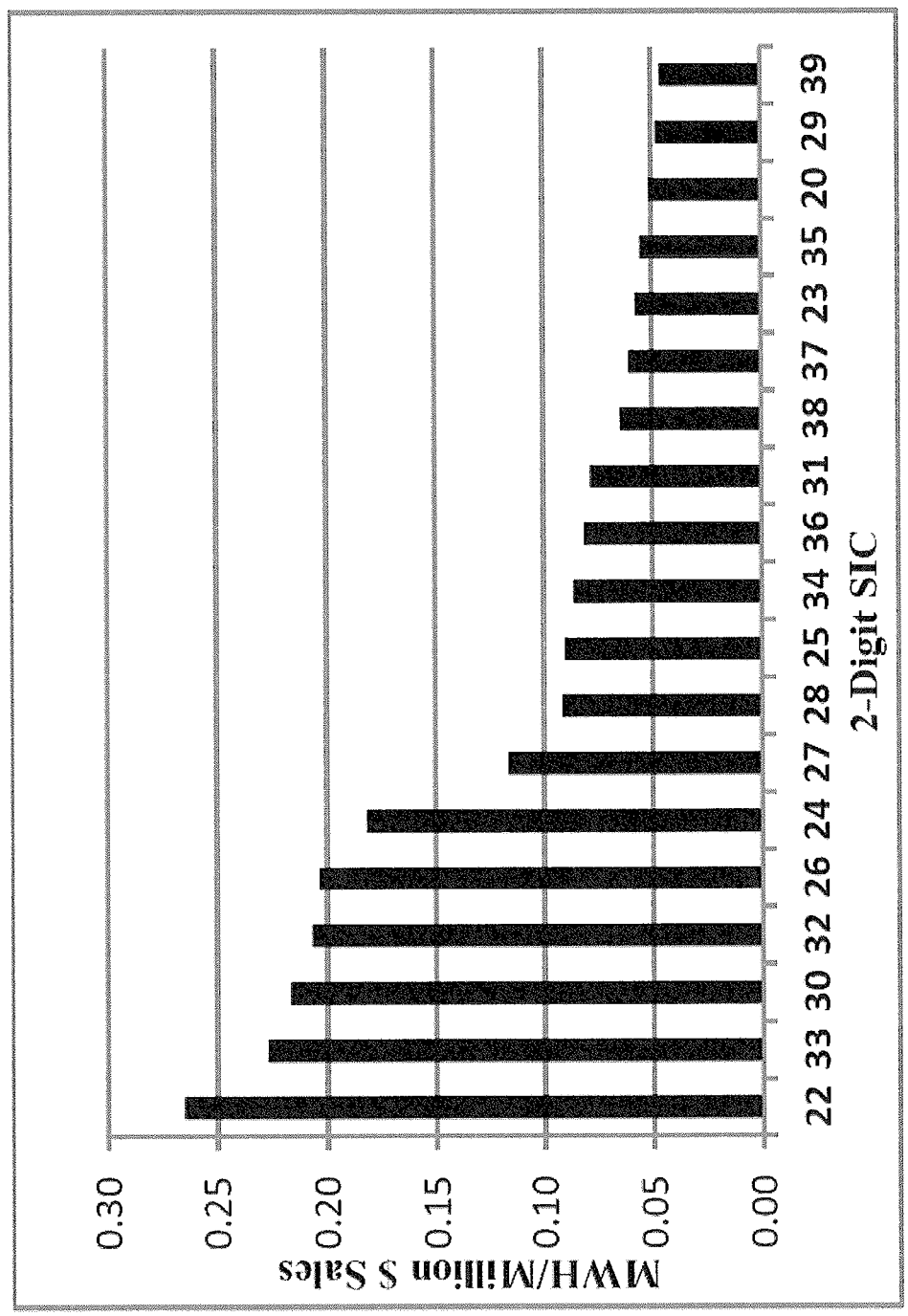
FIG. 7 is an exemplary graph of electric intensity for selected manufacturing sectors generated by the industrial analytic system.
Figure 8:
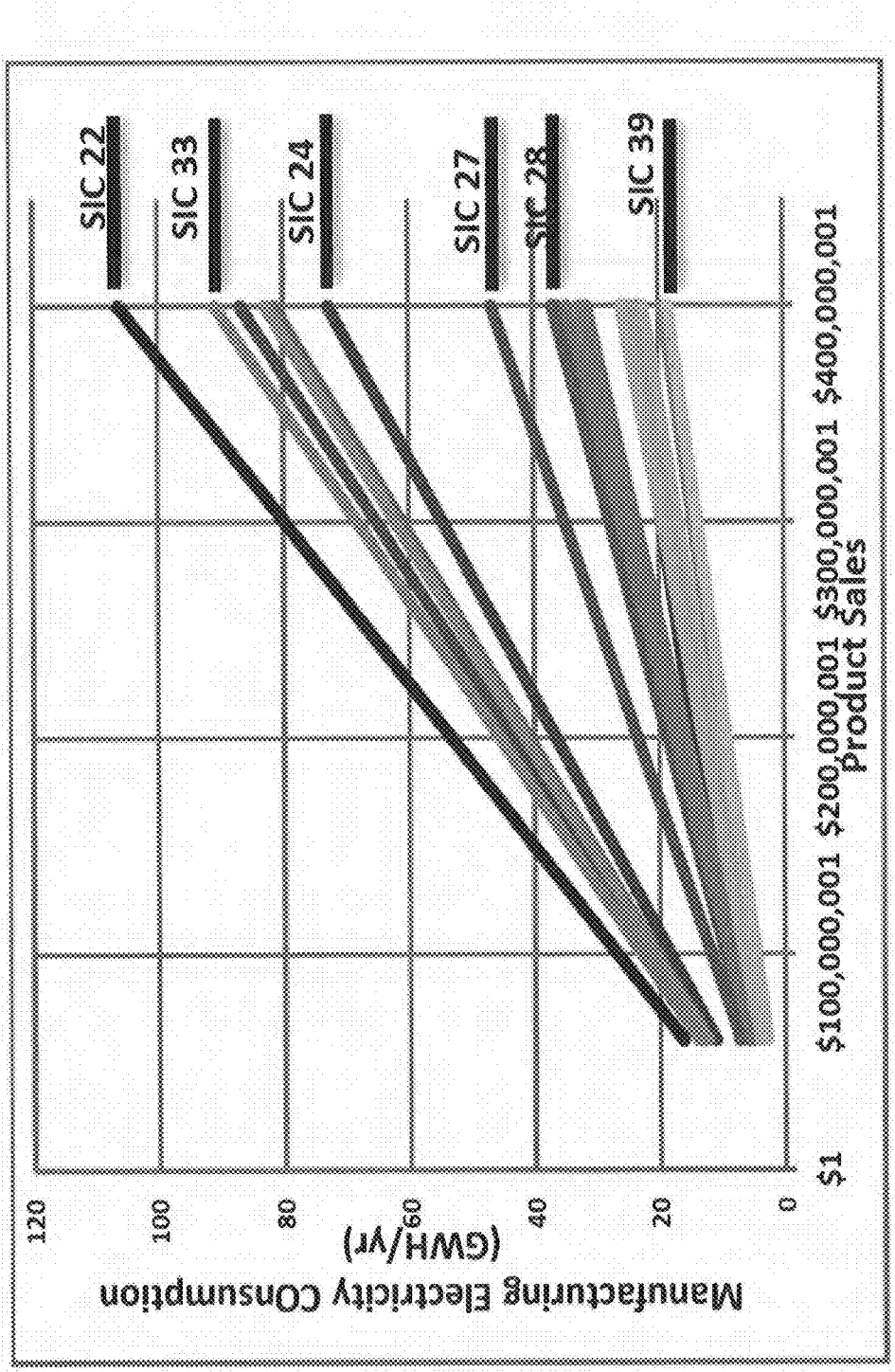
FIG. 8 is a second exemplary graph of electric intensity for selected manufacturing sectors generated by the industrial analytic system.

In use, the industrial analytic systems provides multi-layer industrial energy information including industrial energy information across major industry groups (e.g., a first layer at a two digit SIC code) and industrial energy information by specific industries (e.g., a second layer at a four digit SIC code). FIG. 7 shows the ELI in kWh per product sales in dollars for nine major industry groups and the electricity consumption as a function of product sales, respectively renderer by the layout engine or rendering engine that interfaces the computational module 110 and geospatial model 112. The highest electricity intensities within these major two digit SIC code industry groups are represented by the highest bars as shown in FIG. 7 and the highest slopes as shown in FIG. 8. The top three electricity intensive industrial sectors are Textile Mill Products (SIC 22), Primary Metal Industries (SIC 33) and Rubber and Miscellaneous Plastics Products (SIC 30) as shown in FIG. 7. In Textile industry, electricity is a primary power source for machinery such as winding/spinning, weaving, water pumps, dryers, cooling and temperature control systems. Primary metal industry (iron, steel, and non-ferrous metals) is in top three because of the intensive use of electric arc furnaces, induction furnaces, electrolysis, etc. Rubber and plastic, mixing, extruders, and mills are electricity intensive equipment in tire manufacturing. Mixing, laminating, injection molding, blow molding, extrusion molding, all these operations consume significant amounts of electricity. Known electricity intensive industries such as computer and electronics (SIC 36) are not illustrated because the automated analysis identifies the highest combined effect of electricity consumption and product sales in this analysis. In textiles, product sales values are not as significant in comparison to computer and electronics product sales value. The analysis shows the importance of electricity to industries like textile, primary metals, and rubber and further suggests that a slight change in sales can have a major impact on ELI.

Figure 9:
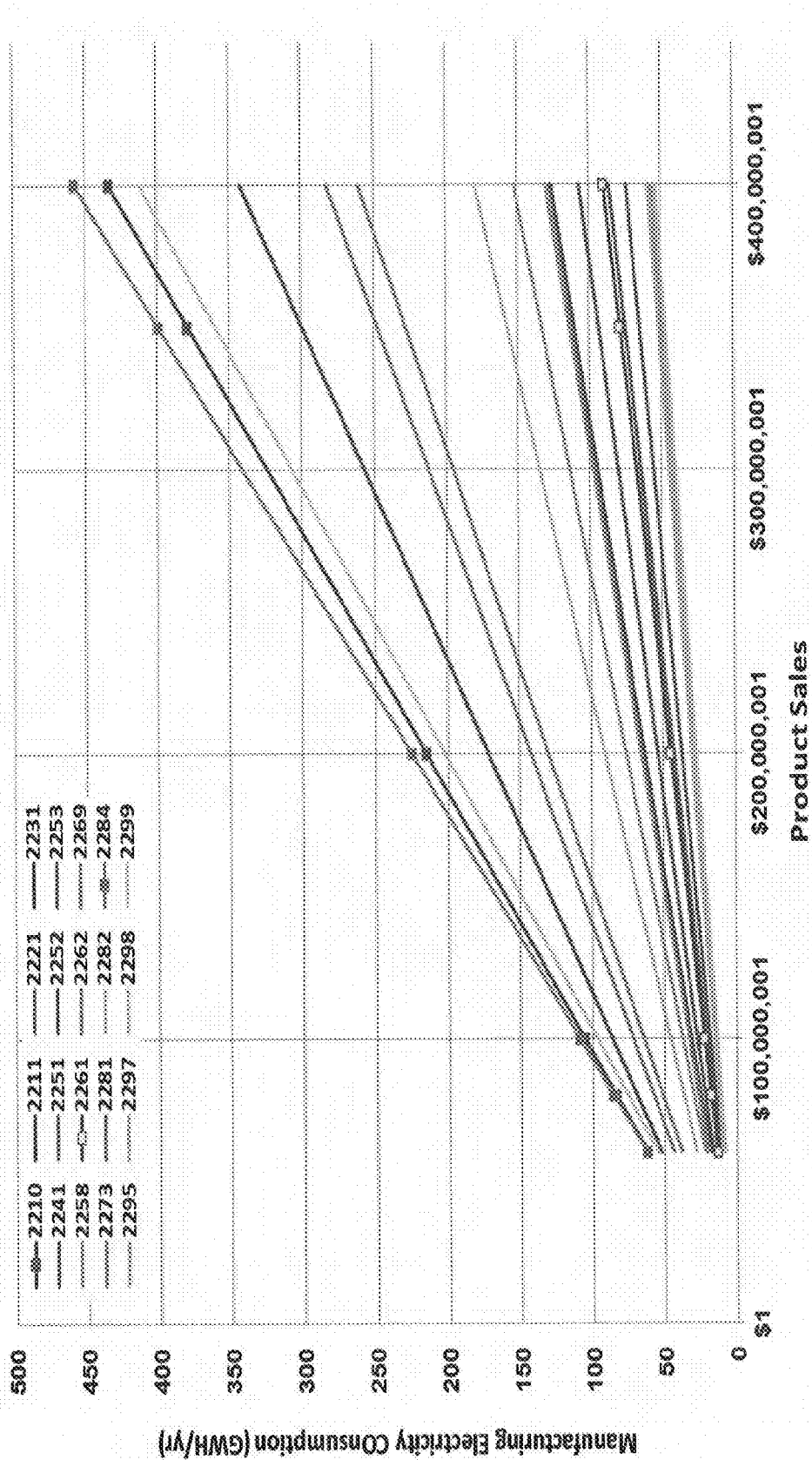
FIG. 9 is an exemplary graph of electric consumption versus product sales for selected manufacturing sectors generated by the industrial analytic system.
Figure 10:
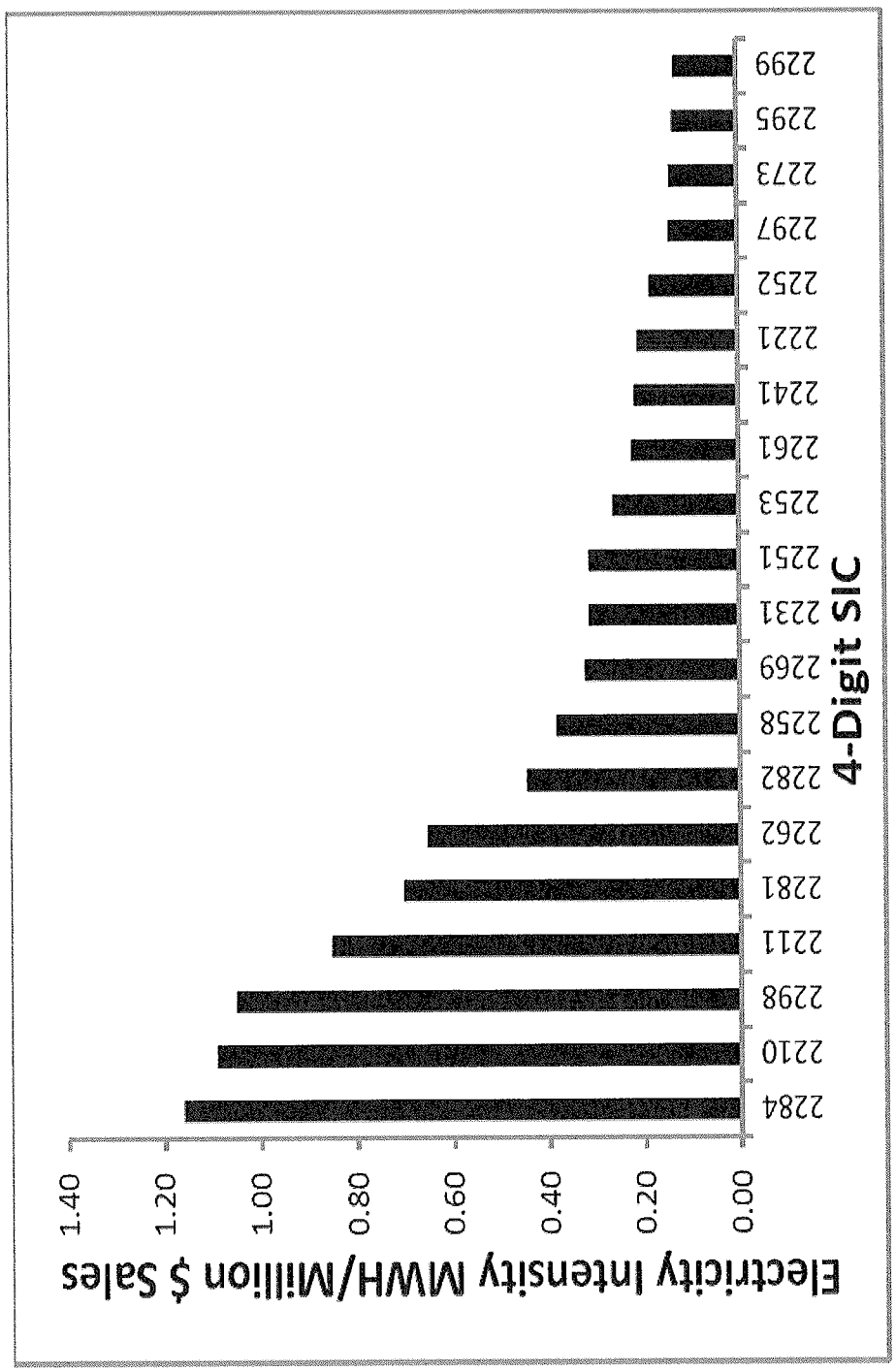
FIG. 10 is an exemplary graph of electric intensity for a specific industry generated by the industrial analytic system.
Figure 11:
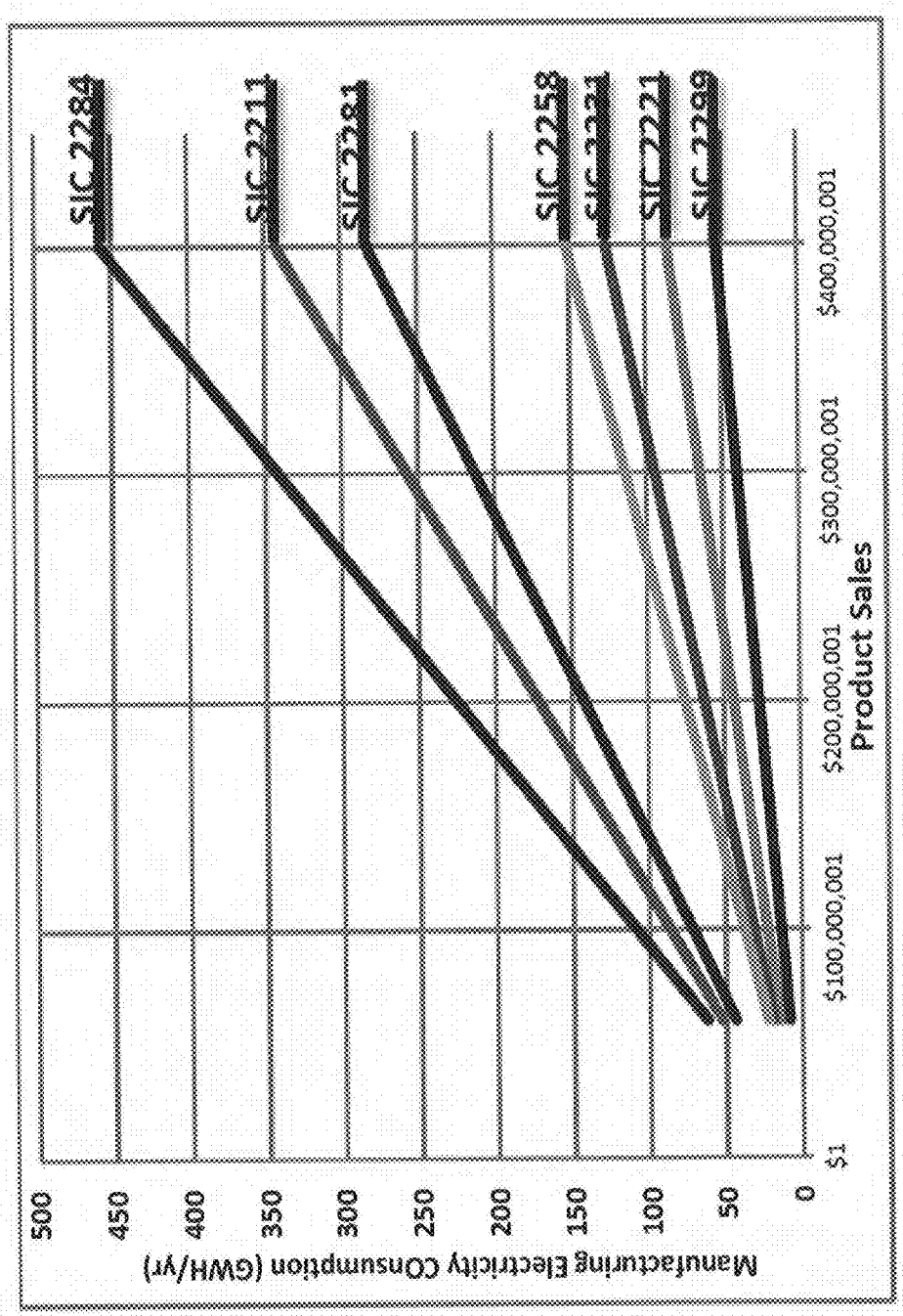
FIG. 11 is an exemplary graph of electric consumption versus product sales for a plurality of related industries generated by the industrial analytic system.

Layer 1 of the analysis performed by the industrial analytic systems provides information on the major industry sectors where the combined effect of electricity and product sales is significant. Layer 2 of the analysis performed by the industrial analytic systems returns information on specific type of industries within these sectors including analysis at the process level within each of these industries. FIG. 10 shows that the top 3 electricity intensive industries in an exemplary textile sector analysis rendered by the layout engine or rendering engine in industry group SIC 2284 Thread Mills, SIC 2210 Broad woven Fabric Mills, Cotton, and SIC 2298 cordage and twine (hemp rope made in spinning mills). The analysis identifies industries that are more likely to be affected by energy efficiency programs and demand response programs. The analytics provided by the industrial analytic systems may provide plant managers the ability to gauge plant performance within their SIC code bracket. FIGS. 9 and 11 shows representative sample of textile industries. The slope in these displays represents the electricity intensity in MWH per product sales. Steep slopes reflect electricity intensive industries in a given sector.

Figure 12:
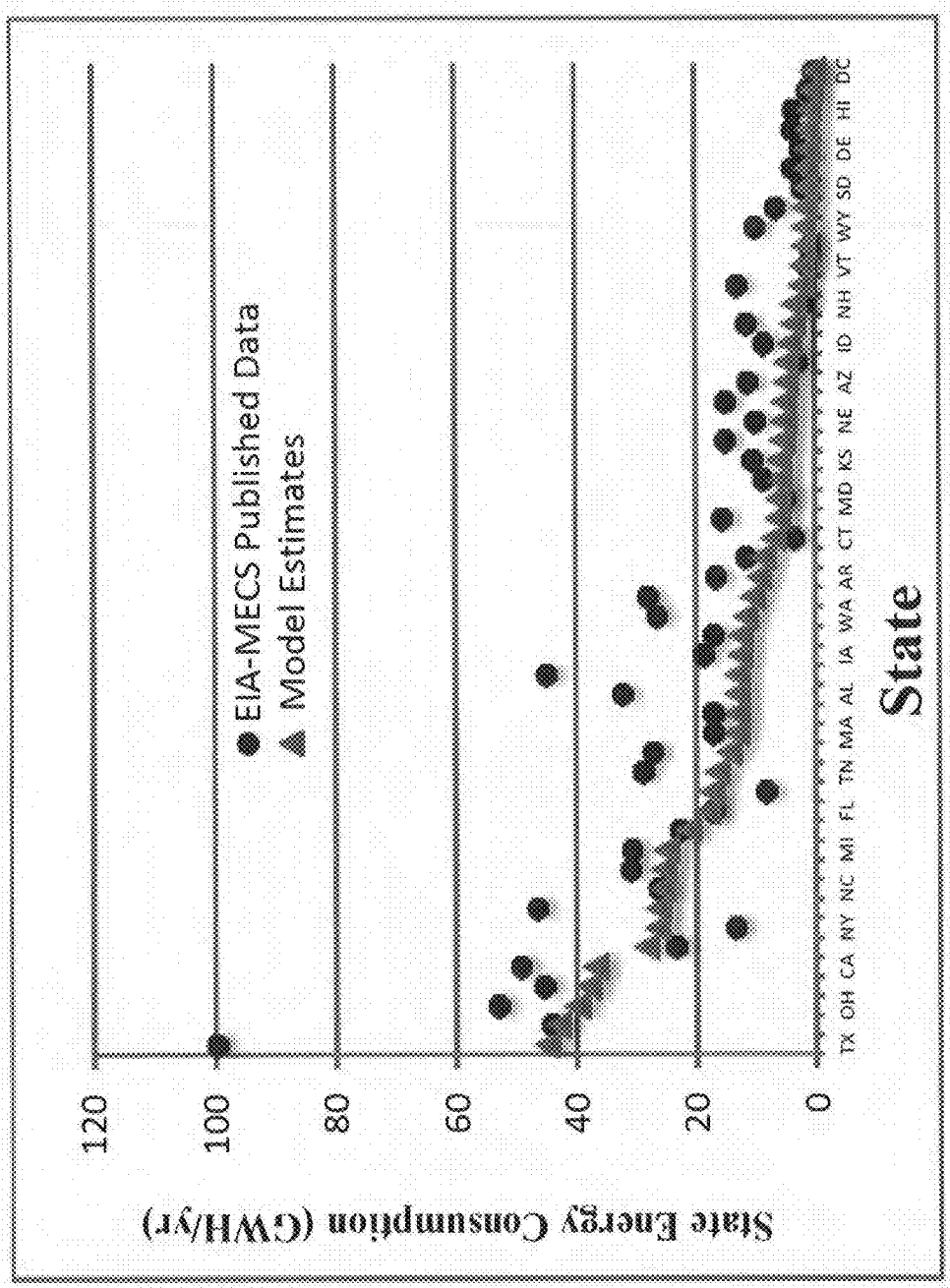
FIG. 12 is a comparison of the data generated by the analytic system against published data.

In a second use, the industrial analytic systems modeled industrial electrical energy consumptions at the state level and were compared to those published by DOE's EIA-MECS. As shown in FIG. 12, an industrial analytic system processed data from IAC DB to the population of manufacturing plants (300,000+) in the MNI DB. The results were compared with the industrial electricity consumption state level data from the DOE's EIA-MECS. While the layout or rendering engine may format and display information on all fifty states a subset is shown due to the limited space of the drawings. As can be seen, the fitted data from industrial analytic systems in most of the cases correlates with the EIA-MECS published data.

Figure 13:
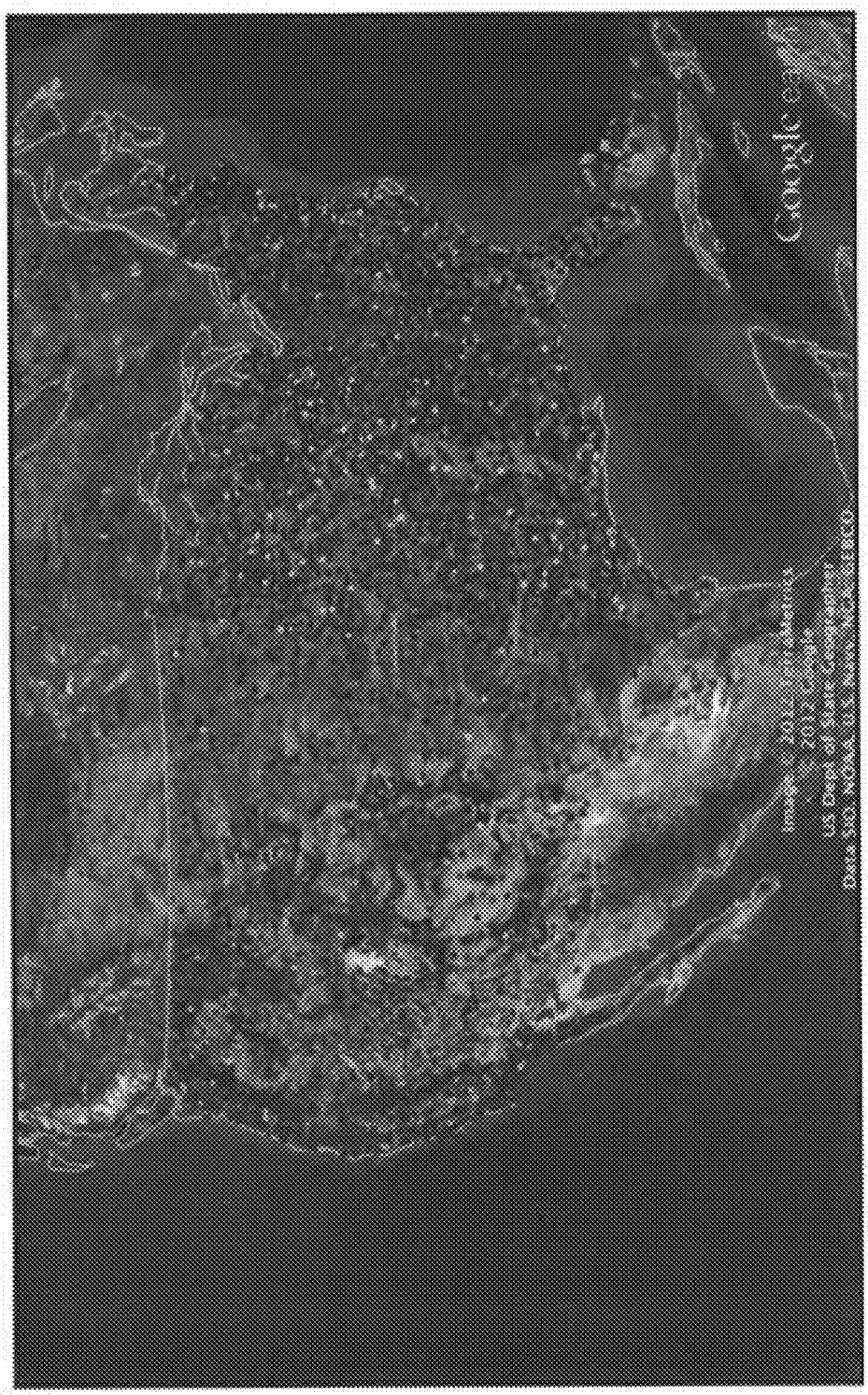
FIG. 13 is a geospatial representation of industries rendered by the industrial analytic system.
Figure 14:
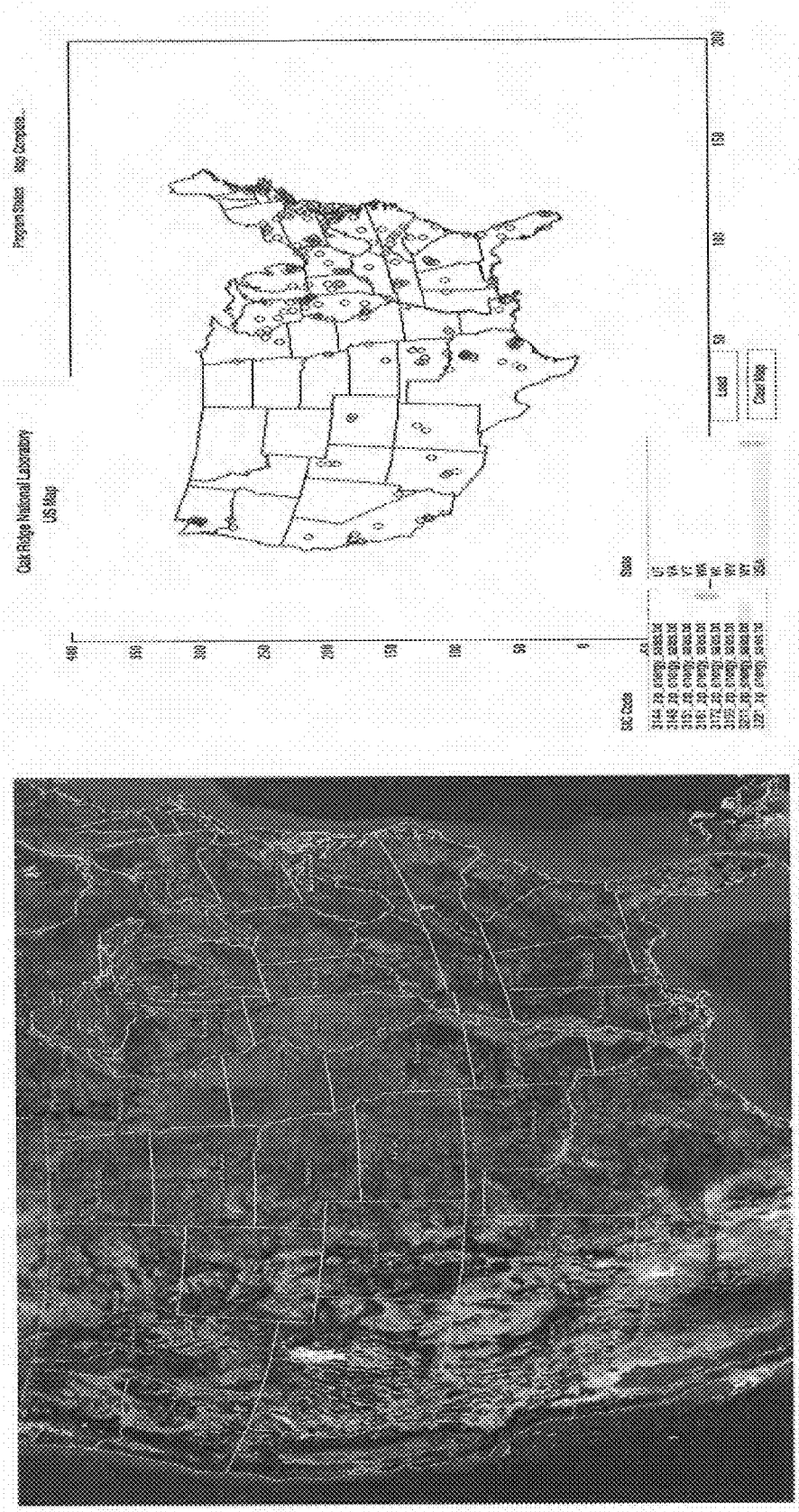
FIG. 14 is a second geospatial representation of industries rendered by the industrial analytic system.
Figure 15:
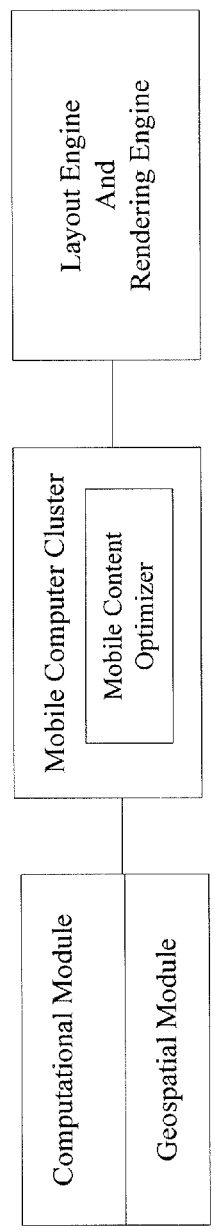
FIG. 15 is a mobile computer server cluster that optimizes content delivered by the layout engine and the rendering engine to a variety of mobile device clients.
Figure 16:
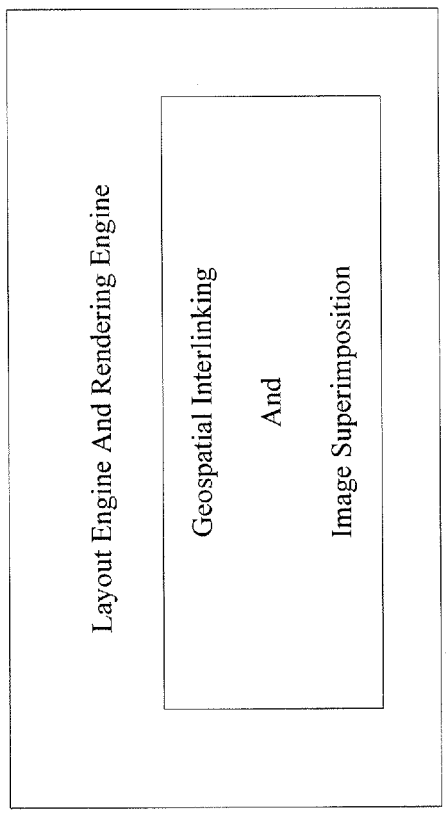
FIG. 16 is a layout engine and a rendering engine that provides geospatial interlinking to virtual globes and superimposes images and objects.

As shown in FIGS. 13 and 14 the industrial analytic systems provides geospatial interlinking to virtual globes and superimposes images and objects on satellite imagery, aerial photography, three dimensional geographic information system globes, and/or two dimensional maps. Mailing addresses for the plants may provide zip codes which are directly linked to the plant's geospatial coordinates. When linked to the manufacturing plant level energy information each plant is mapped by the layout engine and rendering engine of industrial analytic systems. Alternatively, some systems display information two or three dimensional maps or may interface Google Earth™ as shown in FIG. 13. FIG. 13 shows geospatial representation of some industries in Google Earth™. And, FIG. 14 shows geospatial representations of flat glass plants (SIC 3211) on a map.

The industrial analytic systems may utilize available information in publicly available datasets via publicly accessible distributed networks like the Internet or Wide Area Networks to provide estimate of manufacturing electrical energy consumption at multiple levels of details and may require minimal user input. Access to the systems analytics and models may require a user to enter as little as a zip code or an SIC code of desired industrial plant. But the automated data output is vast and may include information such as electric energy intensity (MWH/$) per industry type and per zip code at the state and nationwide levels. Alternative versions of the system includes manufacturing processes steps, energy intensive processes, applicable energy efficiency technologies, and may combine heat and power, to provide detailed analysis on indices of interest such as CHP capabilities across manufacturing sector, available low grade waste heat per industry type and per Region. All of the output may be rendered at a geo-spatial resolution.

The methods, devices, systems, and logic described above may be implemented in or may be interfaced in many other ways in many different combinations of hardware, software or both hardware and software and may be used to process industrial data and visually display objects and content through a visualization engine. For example some alternative industrial analytic system's computational modules 110 and geospatial modules 112 interface a separate mobile computer server or server cluster (also referred to as the mobile architecture) that optimizes the renderings of the content delivered by the layout engine and rendering engine to a variety of mobile devices by fitting the content to the form factor of the device. The mobile architecture receives and the content such as the HTML, scripts, etc., and transforms it to the size and orientation of the requesting mobile device client. The mobile computer server considers what is and what is not supported by the requesting mobile device client such as the script or version of script, flash, etc. that may or not be supported and then changes the objects, information, software, etc. and sends the changed content and software that may be consumed by the mobile device client. The more advanced the mobile device, the more features the mobile computer server will serve to the mobile device client. The mobile computer server translates the content in a variety of different ways as dictated by the disparate operating systems and/or data/software requirements of the mobile device client.

All or parts of the system described above may be executed through one or more controllers, one or more microprocessors (CPUs), one or more signal processors (SPU), one or more graphics processors (GPUs), one or more application specific integrated circuit (ASIC), one or more programmable media or any and all combinations of such hardware. All or part of the logic and modules described above may be implemented as instructions stored on a non-transitory medium executed by a CPU/SPU/GPU that comprises electronics including input/output interfaces, and an up-dateable memory comprising at least a random access memory which is capable of being updated via an electronic medium and which is capable of storing updated information, processors (e.g., CPUs, SPUs, and/or GPUs), controller, an integrated circuit that includes a microcontroller on a single chip or other processing devices and may be displayed through a display driver in communication with a remote or local display, or stored and accessible from a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, includes a specifically programmed non-transitory storage medium and computer readable instructions stored on that medium, which when executed, cause the device to perform the specially programmed operations according to the descriptions above. An engine is one or more specially programmed processors or application programs stored on a non-transitory medium that manages and manipulates data. And a cluster is a group of independent network computers servers that operate—and appear to clients—as if they were a single unit.

The industrial analytic systems may evaluate industrial content shared and/or distributed among multiple users and system components, such as among multiple processors and memories (e.g., non-transient media), including multiple distributed processing systems. Parameters, databases, software, filters and data structures used to evaluate and analyze or pre-process the messages may be separately stored and executed by the processors. It may be incorporated into a single memory block or database, may be logically and/or physically organized in many different ways, and may be implemented in many ways. The programming executed by the industrial analytic systems may be parts (e.g., subroutines) of a single program, separate programs, application program or programs distributed across several memories and processor cores and/or processing nodes, or implemented in many different ways, such as in a library or a shared library accessed through a client server architecture across a private network or publicly accessible network like the Internet. The library may store industrial classification model software code that performs alternative modeling and classifications described herein. While various embodiments have been described, it will be apparent to those of ordinary skill in the art that many more embodiments and implementations are possible.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An industrial analytic system that processes industrial data comprising:
   a database engine that provides access to a plurality of database management systems that serve energy consumption data and product sales data;
   a microprocessor and memory rendering:
      an input filter that selectively passes filtered data streams from the plurality of database management systems that comprise energy sales data, location data, and a business classification code data in filtered datasets by removing selected datasets that do not include energy information;
      a standard deviation filter that removes second selected datasets from the filtered datasets that fall outside of a predetermined range based on a modeled error and automatically inserting datasets associated with the standard industrial classification in place of the second selected datasets to render second filtered datasets; and
      a computation model in communication with the standard deviation filter that analyzes correlation between electrical energy consumption represented in the second filtered datasets and a predetermined criteria associated with an industry; and a mobile server in communication with the computation model and a plurality of requesting mobile devices through a distributed network, the mobile server identifies requesting mobile devices and requesting mobile devices' operating systems in communication with the mobile server from mobile-side data, adapts code and functionality of an energy consumption model generated by the computation model to the operating systems and functionalities of each of the requesting mobile devices and transmits the adapted code and functionality to the requesting mobile devices.

2. The system of claim 1 where the database engine mines data from remote databases.

3. The system of claim 2 where the remote databases comprise publicly populated databases and government populated databases.

4. The system of claim 1 where the database engine mines data from Internet Web portals.

5. The system of claim 1 where the input filter combines datasets generated by a data fusion that combines data mined from a plurality of remote data sources.

6. The system of claim 1 where the input filter removes datasets that do not comprise energy sales information.

7. The system of claim 1 where the second filtered datasets are stored in a cloud accessible through the Internet.

8. The system of claim 1 where the energy sales data represents an average value.

9. The system of claim 1 where the predetermined range is based on a three standard deviation with respect to the energy sales data and the energy consumption data.

10. The system of claim 9 where the inserted datasets represent a mean of a geographic regional dataset associated with the standard industrial classification that the second selected datasets belonged to.

11. The system of claim 1 further comprising a coefficient determination filter programmed to remove outlier data from the filtered datasets.

12. The system of claim 1 where the energy consumption model is based on a square footage.

13. The system of claim 1 where the energy consumption model is based on a number of employees per industrial consumer.

14. The system of claim 1 where the energy consumption model is based on operating hours of a business.

15. The system of claim 1 further comprising a layout engine and a rendering engine in communication with the computation model to render geospatial content on the requesting mobile devices.

16. The system of claim 15 where the mobile server comprises a mobile computer server cluster that optimizes content delivered by the layout engine and the rendering engine.

17. The system of claim 15 where the layout engine and the rendering engine provides geospatial interlinking to virtual globes and superimposes images and objects on satellite imagery, aerial photography, three dimensional geographic information system globes, and two dimensional maps.

18. A programmable media comprising:

a graphical processing unit in communication with a plurality of databases;

the graphical processing unit that selectively passes filtered data streams from the plurality of databases that comprise energy sales data, location data, and a business classification code data in filtered datasets by removing selected datasets that do not include energy information;

the graphical processing unit further removes second selected datasets from the filtered datasets that fall outside of a predetermined range based on a modeled error and automatically inserting datasets associated with a standard industrial classification to render second filtered datasets; and the graphical processing unit further renders a computation model that analyzes correlation between electrical energy consumption represented in the second filtered datasets and a predetermined criteria associated with an industry; and the graphical processing unit in communication with a mobile server that identifies requesting mobile device clients and requesting mobile device clients' operating systems in communication with the mobile server, adapts software code and functionality of an energy consumption models generated by the computation model to the operating systems and functionality of the requesting mobile device clients, and transmits the adapted code and the functionality to the requesting mobile device clients.

19. The programmable media of claim 18 where the graphical processing unit is further configured to geospatially interlink the second filtered datasets to virtual globes and superimposes images and objects on satellite imagery, aerial photography, three dimensional geographic information system globes, or two dimensional maps.

20. The programmable media of claim 18 where the mobile server optimizes content delivered by the graphical processing unit to a variety of requesting mobile device clients by fitting content and the functionality to the from factor of the requesting mobile device clients.

21. A method of analyzing industrial data comprising:

providing a processor and memory:

accessing, under instructions from the processor and memory a plurality of database management systems that serve energy consumption data and product sales data;

passing selectively filtered data streams from the plurality of database management systems that comprise energy sales data, location data, and a business classification code data in filtered datasets by removing, under instructions from the processor and memory selected datasets that do not include energy information;

removing, under instructions from the processor and memory second selected datasets from the filtered datasets that fall outside of a predetermined range based on a modeled error and automatically inserting datasets associated with a standard industrial classification to render a second filtered dataset; and analyzing, under instructions from the processor and memory correlation between electrical energy consumption represented in the second filtered datasets and a predetermined criteria associated with a manufacturing industry; and detecting, under instructions from the processor and memory, requesting mobile device clients and the requesting mobile device clients' operating systems;

adapting software code and functionality of a plurality of electrical energy consumption models to the detected operating systems and functionality of one of the detected requesting mobile device clients; and transmitting the adapted code and functionality to one of the detected requesting mobile device clients;

where the instructions are stored on a non-transitory machine-readable storage medium.

* * * * *